United States Patent
Lee et al.

(10) Patent No.: US 11,726,823 B2
(45) Date of Patent: Aug. 15, 2023

(54) ELECTRONIC DEVICE HAVING HETEROGENEOUS PROCESSORS AND METHOD OF PROCESSING TASK USING THE HETEROGENEOUS PROCESSORS

(71) Applicant: Samsung Electronics Co., Ltd., Suwon-si (KR)

(72) Inventors: Hyo Jeong Lee, Seoul (KR); Myeong Jong Kim, Seoul (KR); Hoon Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 424 days.

(21) Appl. No.: 17/107,260

(22) Filed: Nov. 30, 2020

(65) Prior Publication Data

US 2021/0248011 A1 Aug. 12, 2021

(30) Foreign Application Priority Data

Feb. 6, 2020 (KR) .......................... 10-2020-0014043
Jul. 9, 2020 (KR) .......................... 10-2020-0084837

(51) Int. Cl.
*G06F 9/50* (2006.01)
*G06F 9/48* (2006.01)

(52) U.S. Cl.
CPC .......... *G06F 9/5027* (2013.01); *G06F 9/4881* (2013.01); *G06F 2209/5017* (2013.01)

(58) Field of Classification Search
None
See application file for complete search history.

(56) References Cited

U.S. PATENT DOCUMENTS

| | | | | |
|---|---|---|---|---|
| 6,052,707 A * | 4/2000 | D'Souza | ............... | G06F 9/4881 718/107 |
| 7,379,888 B1 * | 5/2008 | Mahapatro | ............. | G06Q 10/06 705/7.23 |
| 7,593,905 B2 * | 9/2009 | He | ......................... | G06N 3/126 700/47 |
| 8,117,611 B2 * | 2/2012 | Doganata | ................ | G06F 9/548 717/174 |
| 8,201,176 B2 | 6/2012 | Tatsubori et al. | | |

(Continued)

OTHER PUBLICATIONS

Chu et al.; "Task Allocation in Distributed Data Processing"; IEEE Nov. 1980; (Chu_1980.pdf; pp. 57-69) (Year: 1980).*

(Continued)

*Primary Examiner* — Hiren P Patel
(74) *Attorney, Agent, or Firm* — Muir Patent Law, PLLC

(57) ABSTRACT

An electronic device includes a master processor, and processors operatively coupled to the master processor. The master processor processes a task including subtasks using the processors. Each processor is assigned to at least one subtask of the subtasks to process at least one subtask. The master processor groups the subtasks into groups in consideration of execution dependencies among the subtasks, regardless of which processor of the processors is to process at least one subtask, compare a number of the groups and a number of the processors to generate a comparison result, generate worker threads, wherein a number of the worker threads depends on the comparison result, and process the subtasks using the processors through the worker threads.

16 Claims, 16 Drawing Sheets

(56) References Cited

U.S. PATENT DOCUMENTS

| | | | |
|---|---|---|---|
| 8,209,703 B2* | 6/2012 | Yee | G06F 16/254 |
| | | | 710/21 |
| 8,782,645 B2 | 7/2014 | Breternitz et al. | |
| 8,990,820 B2* | 3/2015 | Plancarte | G06F 9/4843 |
| | | | 718/101 |
| 9,009,711 B2* | 4/2015 | Wein | G06F 9/546 |
| | | | 718/104 |
| 9,021,430 B2 | 4/2015 | Park et al. | |
| 9,092,255 B2 | 7/2015 | Yamauchi et al. | |
| 9,384,053 B2* | 7/2016 | Suzuki | G06F 9/50 |
| 9,747,127 B1* | 8/2017 | Florissi | G06F 9/46 |
| 9,772,971 B2 | 9/2017 | Smith | |
| 10,545,797 B2 | 1/2020 | Kuesel et al. | |
| 10,936,359 B2* | 3/2021 | Yang | G06F 9/5038 |
| 2004/0203363 A1 | 10/2004 | Carlton et al. | |
| 2005/0066330 A1* | 3/2005 | Kanai | G06F 1/329 |
| | | | 718/102 |
| 2007/0283358 A1* | 12/2007 | Kasahara | G06F 9/5044 |
| | | | 718/104 |
| 2014/0337849 A1* | 11/2014 | Seo | G06F 9/4881 |
| | | | 718/102 |
| 2015/0134386 A1* | 5/2015 | Jogalekar | G06Q 10/063118 |
| | | | 705/7.13 |
| 2017/0097854 A1 | 4/2017 | Shah et al. | |
| 2018/0032376 A1* | 2/2018 | Udava | G06F 9/4881 |

OTHER PUBLICATIONS

Gonnet et al.; "QuickSched: Task-based parallelism with dependencies and conflicts"; arXiv:1601.05384v1 [cs.DC] Jan. 20, 2016; (Gonnet_2016.pdf; pp. 1-24) (Year: 2016).*

* cited by examiner

FIG. 9
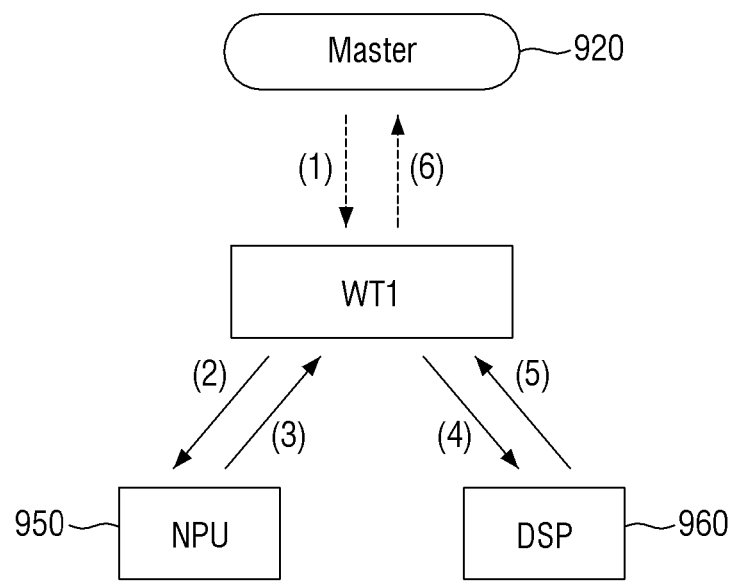
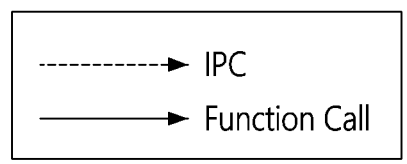

ELECTRONIC DEVICE HAVING HETEROGENEOUS PROCESSORS AND METHOD OF PROCESSING TASK USING THE HETEROGENEOUS PROCESSORS

This application claims priority from Korean Patent Application Nos. 10-2020-0014043 filed on Feb. 6, 2020 and 10-2020-0084837 filed on Jul. 9, 2020 in the Korean Intellectual Property Office, the disclosures of which are incorporated by reference herein in their entirety.

BACKGROUND

1. Technical Field

The present disclosure relates to an electronic device including heterogeneous processors and a method of processing a task using the heterogeneous processors.

2. Description of the Related Art

As an amount of computation increases, a computing system which processes tasks using different heterogeneous processors is used. Processors used in the computing system including the heterogeneous processors include various cores such as a CPU (central processing unit), a GPU (graphics processing unit), a DSP (digital signal processor), and an NPU (neural processing unit), an ASIC hardware accelerator and the like.

The computing systems including the heterogeneous processors are used for rapidly processing complex algorithms in cooperation with each other, and are used in specialized fields such as mobile visual processing, deep learning, and neural network.

SUMMARY

Aspects of the present invention provide an electronic device including heterogeneous processors in which an operating performance is improved.

Aspects of the present invention also provide a method for processing a task using heterogeneous processors in which an operating performance is improved.

However, aspects of the present invention are not restricted to the one set forth herein. The above and other aspects of the present invention will become more apparent to one of ordinary skill in the art to which the present invention pertains by referencing the detailed description of the present invention given below.

According to an exemplary embodiment of the present invention, an electronic device includes a master processor, and a plurality of processors operatively coupled to the master processor. The master processor is configured to process a task including a plurality of subtasks using the plurality of processors. Each of the plurality of processors is assigned to at least one subtask of the plurality of subtasks to process at least one subtask. The master processor is configured to group the plurality of subtasks into a plurality of groups in consideration of execution dependencies among the plurality of subtasks, regardless of which processor of the plurality of processors is to process at least one subtask of the plurality of subtasks, compare a number of the plurality of groups and a number of the plurality of processors to generate a comparison result, generate a plurality of worker threads, wherein a number of the plurality of worker threads depends on the comparison result, and process the plurality of subtasks using the plurality of processors through the plurality of worker threads.

According to an exemplary embodiment of the present invention, a method of processing a task using a master processor and a plurality of heterogeneous processors includes receiving dependency information between a plurality of subtasks of the task to be processed by the plurality of heterogeneous processors, grouping the plurality of subtasks into a plurality of groups in consideration of the dependency information, regardless of which processor of the plurality of heterogeneous processors is to process at least one subtask of the plurality of subtasks, comparing a number of the plurality of groups and a number of the plurality of heterogeneous processors to generate a comparison result, generating a plurality of worker threads, wherein a number of the plurality of worker threads depends on the comparison result, and processing the plurality of subtasks using the plurality of heterogeneous processors through the plurality of worker threads.

According to an exemplary embodiment of the present invention, a method of processing a task using a master processor and a plurality of heterogeneous processors, includes providing the task including a first subtask to be processed by a first processor of the plurality of heterogeneous processors, and a second subtask having a first execution dependency on the first subtask and to be processed by a second processor of the plurality of heterogenous processors, grouping the first subtask and the second subtask into a first group based on the first execution dependency, generating a first worker thread which executes the first and second subtasks included in the first group, and processing, according to the first execution dependency, the first subtask using the first processor and the second subtask using the second processor by using the first worker thread.

BRIEF DESCRIPTION OF THE DRAWINGS

The above and other aspects and features of the present invention will become more apparent by describing in detail exemplary embodiments thereof with reference to the attached drawings, in which:

FIGS. 8 and 9 are diagrams for explaining an effect of the method of processing a task using heterogeneous processors according to some embodiments;

DETAILED DESCRIPTION OF THE EMBODIMENTS

Hereinafter, embodiments according to the technical idea of the present invention will be described with reference to the accompanying drawings.

Figure 1:
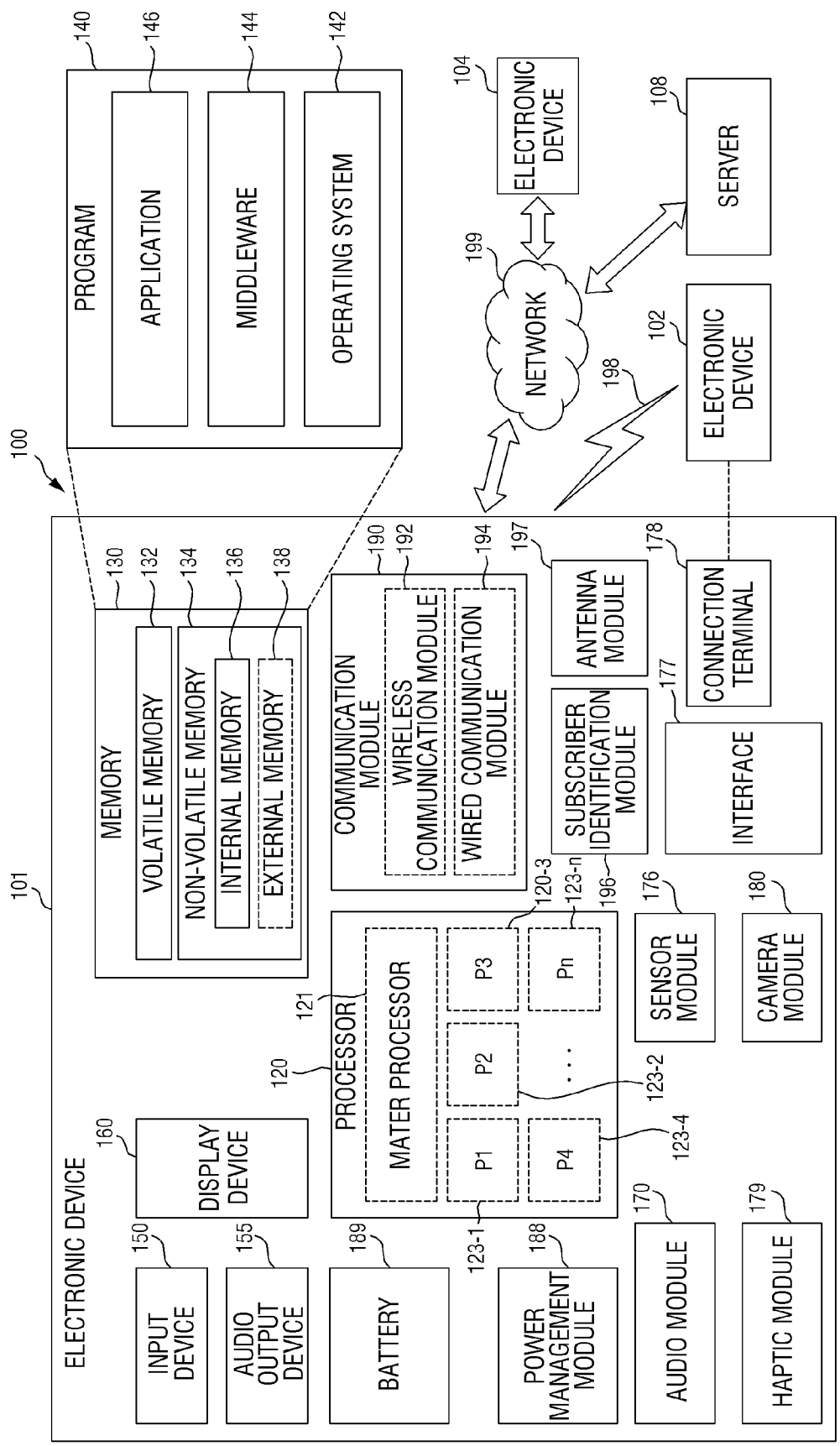
FIG. 1 is a block diagram of an electronic device in a network environment according to some embodiments.
Figure 2:
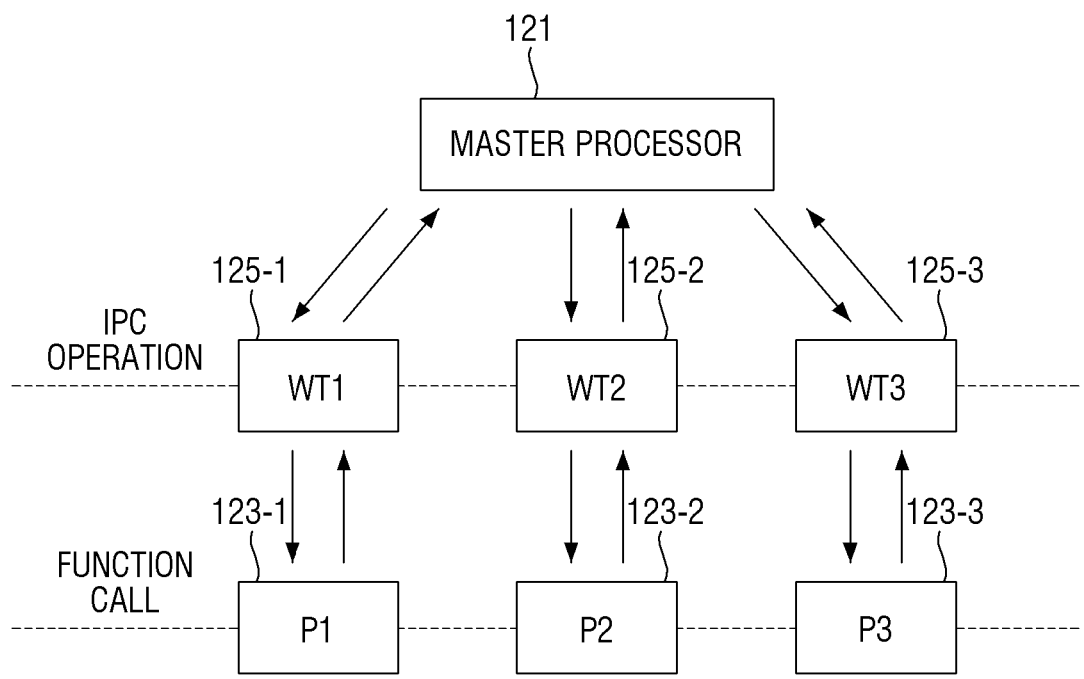
FIG. 2 is a diagram for explaining an operation in which a master processor generates a worker thread to control a plurality of processors.

FIG. 1 is a block diagram of an electronic device in a network environment according to some embodiments. FIG. 2 is a diagram for explaining an operation in which a master processor generates a worker thread to control a plurality of processors.

Referring to FIG. 1, in a network environment 100, an electronic device 101 may communicate with an electronic device 102 through a first network 198, or may communicate with an electronic device 104 or a server 108 through a second network 199.

Here, although the first network 198 may be, for example, a network that supports a short-range wireless communication, and the second network 199 may be, for example, a network that supports a long-range wireless communication, the embodiments are not limited thereto.

In some embodiments, the electronic device 101 may communicate with the electronic device 104 through the server 108.

In some embodiments, the electronic device 101 may include a processor 120, a memory 130, an input device 150, an audio output device 155, a display device 160, an audio module 170, a sensor module 176, an interface 177, a haptic module 179, a camera module 180, a power management module 188, a battery 189, a communication module 190, a subscriber identification module 196, and an antenna module 197.

The term "module" as used herein includes a functional block made up of hardware, software, or firmware, and may be used interchangeably with terms such as logic, logic blocks, components or circuits. The module may be an integrally configured component that performs one or more functions or a part thereof. For example, the module may be configured as an ASIC (application-specific integrated circuit).

In some embodiments, in the electronic device 101, at least one of these components (e.g., the display device 160 or the camera module 180) may be omitted or replaced with another component. Also, in some embodiments, some components may be integrated and implemented in another component. For example, the sensor module 176 may be embedded in the display device 160. The display device 160 with the sensor module 176 may include, for example, a display, and the sensor module 176 may include, for example, a fingerprint sensor, an iris sensor, an illuminance sensor or the like.

The processor 120 may drive (i.e., run) a program 140 to control at least one other component (e.g., hardware or software component) of the electronic device 101 connected to the processor 120, and may perform various data processing and computations.

The processor 120 loads commands or data received from other components (e.g., the sensor module 176 or the communication module 190) into a volatile memory 132 and processes them, and may store the result data thereof in a non-volatile memory 134.

In some embodiments, the processor 120 may include a master processor 121 and a plurality of processors 123-1 to 123-$n$ (here, n is a natural number).

The master processor 121 may control the plurality of processors 123-1 to 123-$n$. Specifically, the master processor 121 may generate a worker thread to control the plurality of processors 123-1 to 123-$n$.

For example, referring to FIG. 2, the master processor 121 may generate a worker thread 125-1 to control the operation of a processor 123-1. The master processor 121 may generate a worker thread 125-2 to control the operation of a processor 123-2. The master processor 121 may generate a worker thread 125-3 to control the operation of a processor 123-3.

Communication between the master processor 121 and the worker threads 125-1, 125-2, and 125-3 may be performed, using an inter-process communication (IPC). A function call may be used for the worker threads 125-1, 125-2, and 125-3 to control the processors 123-1, 123-2, and 123-3. For example, the worker threads 125-1, 125-2 and 125-3 issue function calls to control the processors 123-1, 123-2 and 123-3. In some embodiments, the worker threads 125-1, 125-2 and 125-3 may receive function calls from the processor 123-1, 123-2 and 123-3.

Referring to FIG. 1 again, in some embodiments, the plurality of processors 123-1 to 123-$n$ may be heterogeneous processors which may perform different functions from each other. For example, the processor 123-1 may be a CPU (central processing unit), the processor 123-2 may be a GPU (graphics processing unit), the processor 123-3 may be a DSP (digital signal processor), and the processor 123-4 may be an NPU (neural processing unit). The embodiments are not limited thereto. In some embodiments, the plurality of processors 123-1 to 123-$n$ may include a MPE (media processing engine), an ISP (image signal processor), and the like.

Although FIG. 1 shows that the master processor 121 and a plurality of processors 123-1 to 123-$n$ are included in the processor 120, this is merely for convenience of description, and the embodiments are not limited thereto.

In some embodiments, the plurality of processors 123-1 to 123-$n$ may be implemented as separate chips, and placed in a separated form. Also, in some embodiments, some of the plurality of processors 123-1 to 123-$n$ may be integrated (e.g., embedded) with the master processor 121, and the remaining parts thereof may be implemented as separate chips and placed in the separated form. In some embodiments, some of the plurality of processors 123-1 to 123-$n$ may be implemented as a part of another component associated functionally therewith (e.g., the camera module 180 or the communication module 190).

The memory 130 may store various data used by at least one component (e.g., the processor 120 or the sensor module 176) of the electronic device 101, software (e.g., the program 140), and input data or output data of commands associated therewith.

The memory 130 may include the volatile memory 132 or the non-volatile memory 134.

The program 140 is software stored in the memory 130, and may include, for example, an operating system 142, a middleware 144 or an application program 146.

The input device 150 may be a device for receiving the command or data to be used by the component (e.g., the processor 120) of the electronic device 101 from the outside (e.g., a user) of the electronic device 101. Although examples of the input device 150 may include a microphone, a mouse, a keyboard or the like, the embodiments are not limited thereto.

The audio output device 155 is a device for outputting a sound signal to the outside of the electronic device 101, and may include, for example, a speaker used in a general purpose such as multimedia playback or recording/playback, and a receiver used exclusively for receiving telephone calls. In some embodiments, the receiver may be formed integrally with or separately from the speaker.

The display device 160 is a device for visually providing information to a user of the electronic device 101, and may include, for example, a display, a hologram device, or a projector and a control circuit for controlling the devices. In some embodiments, the display device 160 may include touch circuitry or a pressure sensor capable of measuring the pressure intensity of touch.

The audio module 170 may convert sound and electric signals bidirectionally. In some embodiments, the audio module 170 may acquire sound through the input device 150 or, may output sound through the audio output device 155 or an external electronic device (e.g., a speaker or headphones of the electronic device 102) wired or wirelessly connected to the electronic device 101.

The sensor module 176 may generate electrical signals or data values corresponding to internal operating conditions (e.g., power or temperature) of the electronic device 101 or external environmental conditions. The sensor module 176 may include, for example, a gesture sensor, a gyro sensor, an atmospheric pressure sensor, a magnetic sensor, an acceleration sensor, a grip sensor, a proximity sensor, a color sensor, an IR (infrared) sensor, a biometric sensor, a temperature sensor, a humidity sensor, an illuminance sensor, and the like.

An interface 177 may support a specified protocol for communicating with an external electronic device (e.g., the electronic device 102) by wire or wirelessly. According to an embodiment, the interface 177 may include a HDMI (high definition multimedia interface), a USB (universal serial bus) interface, an SD card interface or an audio interface.

The connection terminal 178 may include a connector that may physically connect the electronic device 101 to an external electronic device (e.g., the electronic device 102). For example, the connector of the connection terminal 178 may include an HDMI connector, a USB connector, an SD card connector or an audio connector (e.g., a headphone connector).

The haptic module 179 may convert an electrical signal into a mechanical stimulus (e.g., vibration or motion) or an electrical stimulus that may be perceived by a user through a tactile sense or a kinesthetic sense. The haptic module 179 may include, for example, a motor, piezoelectric element or an electrostimulator.

The camera module 180 may capture still images and moving images. In some embodiments, the camera module 180 may include one or more lenses, an image sensor, an image signal processor or a flash.

The power management module 188 is a module for managing the power supplied to the electronic device 101, and may be configured, for example, as at least a part of a PMIC (power management integrated circuit).

The battery 189 is a device for supplying electric power to at least one component of the electronic device 101, and may include, for example, a non-rechargeable primary battery, a rechargeable secondary battery or a fuel cell.

The communication module 190 may support establishment of a wired or wireless communication channel between the electronic device 101 and the external electronic device (e.g., the electronic device 102, the electronic device 104 or the server 108), and may perform communication therebetween through the established communication channels. In some examples, the communication module 190 may include one or more communication processors that operate independently of the processor 120 and support the wired or wireless communication. In some embodiments, the communication module 190 includes a wireless communication module 192 (e.g., a cellular communication module, a short-range wireless communication module, or a GNSS (global navigation satellite system) communication module) or a wired communication module 194 (e.g., a LAN (local area network) communication module or a power line communication module), and may communicate with the external electronic device through the first network 198 (e.g., a short-range communication network such as Bluetooth, WiFi direct or IrDA (infrared data association)) or the second network 199 (e.g., a long-range communication network such as a cellular network, Internet or a computer network (e.g., LAN or WAN)), using the corresponding communication module. Such various types of communication modules 190 may be implemented as one chip or separate chips.

In some embodiments, the wireless communication module 192 may distinguish and authenticate the electronic device 101 within the communication network, using user information stored in the subscriber identification module 196.

The antenna module 197 may include one or more antennas for transmitting or receiving signals or power to and from the outside. In some embodiments, the communication module 190 (e.g., the wireless communication module 192) may transmit the signal to the external electronic device or may receive the signal from the external electronic device through an antenna suitable for a communication type.

Some of the components included in the electronic device 101 are connected to each other through inter-peripheral device communication types (e.g., a bus, a GPIO (general purpose input/output), and an SPI (serial peripheral interface), or a MIPI (mobile industry processor interface)) and may exchange signals (e.g., commands or data) with each other.

In some embodiments, commands or data may be transmitted or received between the electronic device 101 and the electronic device 104 through the server 108 connected to the second network 199. Each of the electronic devices 102 and 104 may be the device of the same type as or different type from the electronic device 101. In some embodiments, all or some of the operations performed by the electronic device 101 may be performed on the other or multiple external electronic devices.

In some embodiments, if the electronic device 101 needs to perform any function or service automatically or upon request, the electronic device 101 does not perform the function or service voluntarily, but may request an external electronic device to perform at least some functions associated therewith. The external electronic device that receives such requests may execute the requested functions and transfer the result to the electronic device 101. The electronic device 101 may additionally process the received result to provide the requested function or service. To this end, for example, cloud computing, distributed computing, client-server computing technology or the like may be used.

The electronic device 101 explained above may include various forms of devices. The electronic device 101 may include, for example, but is not limited to, at least one of a mobile communication device (e.g., a smartphone), a computer device, a portable multimedia device, a portable medical device, a camera, a wearable device, and a home appliance.

In some embodiments, the electronic device 101 may be a graph execution-based system that defines the task by a graph and performs the task on the basis of the defined graph. In such a graph execution-based system, a task may be defined by being divided into a plurality of subtasks, and each subtask may form a corresponding node of the graph.

At each node of the graph, the operations of the processor that processes the node among the plurality of processors 123-1 to 123-n, and the processor for processing the corresponding subtask may be defined. The graph is structured on the basis of an execution dependency between nodes (hereinafter, each node of the graph means each subtask that constitutes the task), and the nodes of the graph may be structured without a circular dependency and without a bidirectional dependency. Hereinafter, the execution dependency may also be referred to a dependency unless otherwise described.

Hereinafter, a method of processing the task using heterogeneous processors according to some embodiments will be described with reference to FIGS. 3 to 7, by taking the graph shown in FIG. 3 as an example.

Figure 3:
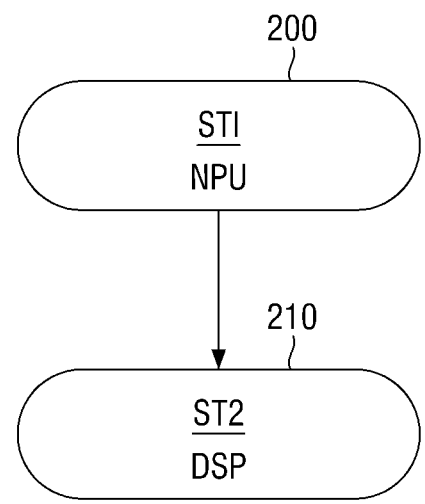
FIG. 3 is a diagram showing an example of tasks defined by a graph structure.
Figure 4:
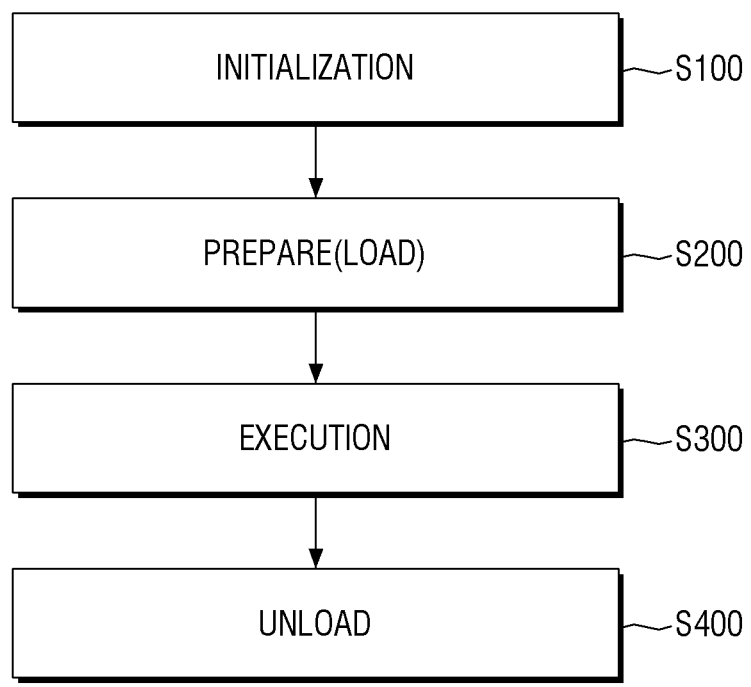
FIG. 4 is a flowchart for explaining a method of processing a task using heterogeneous processors according to some embodiments.
Figure 5:
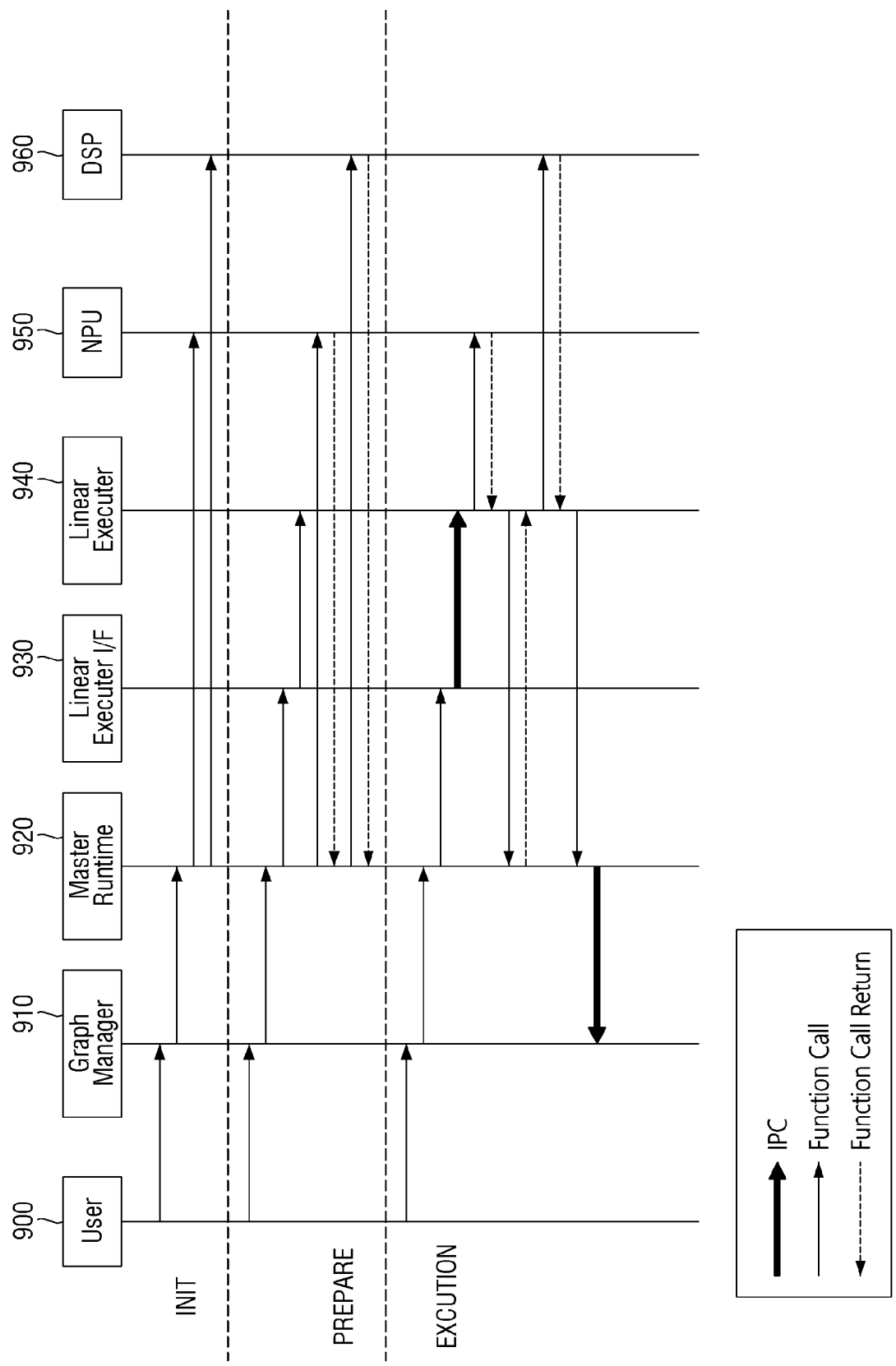
FIG. 5 is a diagram for explaining a method of processing a task using heterogeneous processors according to some embodiments.
Figure 6:
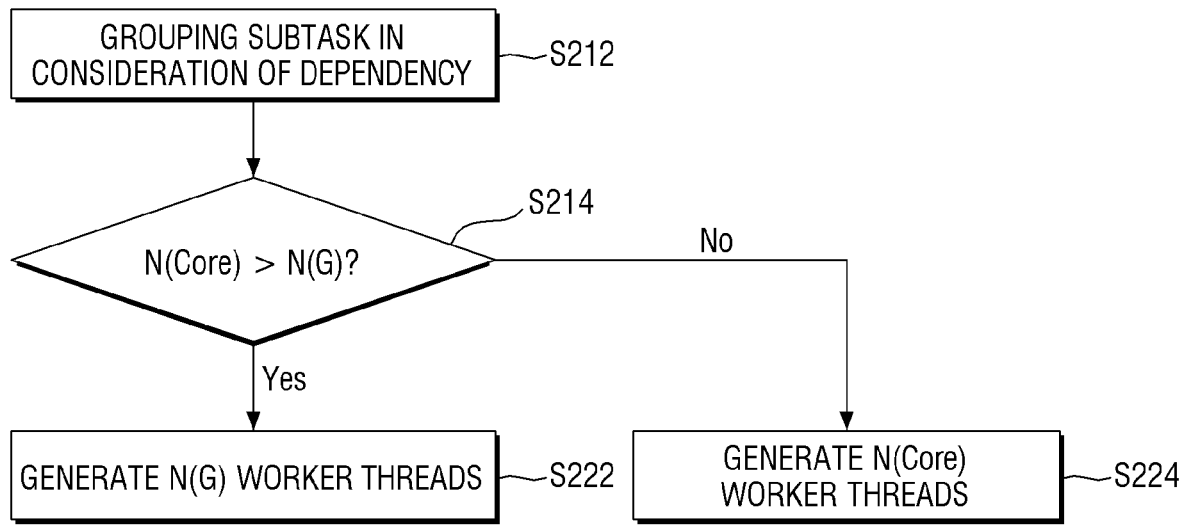
FIGS. 6 and 7 are diagrams for explaining a method of generating a worker thread according to some embodiments.
Figure 7:
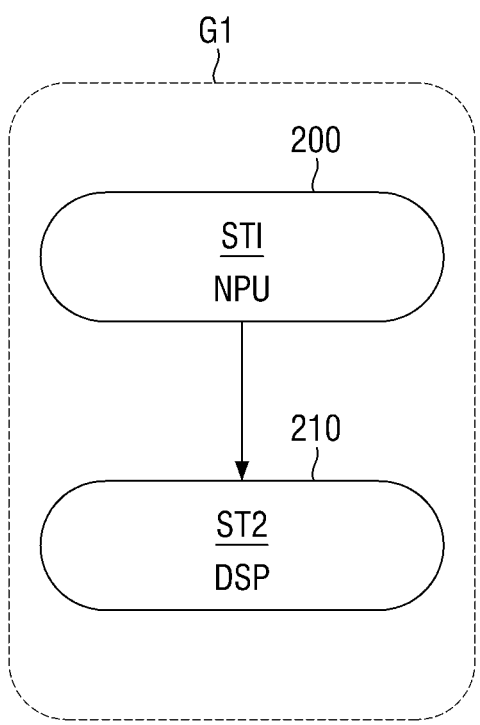

FIG. 3 is a diagram showing an example of task defined by a graph structure. FIG. 4 is a flowchart for explaining a method of processing a task using heterogeneous processors according to some embodiments. FIG. 5 is a diagram for explaining a method of processing a task using heterogeneous processors according to some embodiments. FIGS. 6 and 7 are diagrams for explaining a method of generating a worker thread according to some embodiments.

Referring to FIG. 3, the exemplary task includes two subtasks ST1 and ST2. A subtask ST1 needs to be processed by an NPU, and a subtask ST2 needs to be processed by a DSP.

The subtask ST2 has a dependency on the subtask ST1. For example, after the subtask ST1 is completely processed by the NPU, the subtask ST2 is processed by the DSP. Such dependency may occur when processing of the subtask ST2 needs the processing result of the subtask ST1.

When such tasks are defined by a graph structure, the graph has two nodes 200 and 210. Due to the dependency between the subtask ST1 and the subtask ST2, the node 210 may be referred to as a child node of the node 200.

Referring to FIG. 4, the system is initialized to process the task (S100).

For example, referring to FIG. 5, a user 900 may instruct a graph manager 910 to perform operations required for a system initialization, and the graph manager 91 may instruct a master 920 to perform operations required for the system initialization. The master 920 may instruct the NPU 950 and the DSP 960 required for processing the task to perform the operations required for the system initialization. All the operations performed by function calls, as shown, are indicated using arrows. In the system initialization, the master 920 may issue such function calls without using any worker thread which will be described.

In some embodiments, the master processor (121 of FIG. 1) explained above may run a master 920. In some other embodiments, the master processor (1212 of FIG. 1) explained above may run a graph manager 910 and a master 920. In some other embodiments, the master processor (121 of FIG. 1) explained above may run a graph manager 910, a master 920, and an executor interface 930. In an example embodiment, the master 920, the graph manager 910 and the executor interface 930 may be implemented in firmware run by the master processor 121. Hereafter, the master 920, the graph manager 910 and the executor interface 930 may also be referred, either individually or collectively, to as the master processor 121, unless described otherwise.

Referring to FIGS. 4 and 5, in the present embodiment, the worker thread is not generated in the system initialization step (S100). For example, a dedicated thread for controlling the NPU 950 and a dedicated thread for controlling the DSP 960 are not generated in the system initialization step (S100).

Next, referring to FIG. 4, the graph model is loaded and prepared for processing the task (S200).

In this embodiment, at least one worker thread may be generated in the model preparing step (S200).

Referring to FIGS. 5 and 6, for example, the master 920 requests the executor interface 930 to ready the executor 940, and the executor interface 930 may analyze, in response to the request of the master 920, topology of the graph to group nodes of the graph in serial work units regardless of which processor is to process at least one node of the graph (S212). In some embodiments, the graph nodes connected in series to each other may be grouped together in the grouping of the executor interface 930. In some embodiments, the dependency between the nodes may be taken into consideration in the grouping.

For example, in the task of FIG. 3, the two nodes have serial dependency in which the subtask ST2 of the node 210 is performed by the DSP 960 after the subtask ST1 of the node 200 is completed by the NPU 950. This allows the tasks of FIG. 3 to be grouped into the same group G1, as shown in FIG. 7.

When the grouping task is completed, the number (N(core)) of processors required to process the task is compared with the number (N(G)) of groups determined by the executor 940 (S214).

If the number (N(core)) of processors required to process the task is greater than the number (N(G)) of groups, that is, the number (N(G)) of the groups determined by the executor 940 is smaller than the number (N(core)) of processors required to process task, the operating performance improvement of the system may be expected by such grouping, and a number of worker threads generated by the master 920 may be the same as the number (N(G)) of the groups (S222).

If the number (N(core)) of processors required to process the task is not greater than the number (N(G)) of the groups, the operating performance improvement of the system may not be expected by grouping, and a number of worker threads generated by the master 920 may be the same as the number (N(core)) of processors required to process the task (S224).

In the example of FIG. 3, the number (N(core)) of processors required to process the task is 2 (NPU, DSP), while the number (N(G)) of the groups determined by the executor 940 is 1 as shown in FIG. 7. Thus, the master 920 may generate one worker thread (e.g., the executor 940 of FIG. 5).

Referring to FIG. 4 again, the task is processed, using the generated worker thread and the processor (S300).

For example, referring to FIG. 5, the master 920 may request the executor 940 to execute the subtasks included in the group (G1 of FIG. 7) via the executor interface 930. In the process, a first IPC IPC1 between the executor interface 930 and the executor 940 may occur as shown in FIG. 5. In response to this, the executor 940 instructs the NPU 950 to process the subtask (ST1 of FIG. 3), using a function call, and may receive the result thereof. After the processing of the subtask (ST1 of FIG. 3) is completed, the executor 940 instructs the DSP 960 using a function call to process the subtask (ST2 of FIG. 3), and may receive the result thereof.

When the processing of the subtask is completed, an IPC which transfers completion of the processing may occur. Although FIG. 5 shows that a second IPC IPC2 occurs between the master 920 and the graph manager 910, this may be variously modified and implemented, depending on the configuration of the master processor (121 of FIG. 1). The configuration shown in FIG. 5 is merely an example, and the technical idea of the present invention is not limited thereto.

Referring to FIG. 4 again, when processing of the task is completed, the graph model is unloaded and all the generated worker threads are eliminated (S400).

Hereinafter, an effect of the method of processing a task using heterogeneous processors according to some embodiments will be described with reference to FIGS. 8 and 9.

Figure 8:
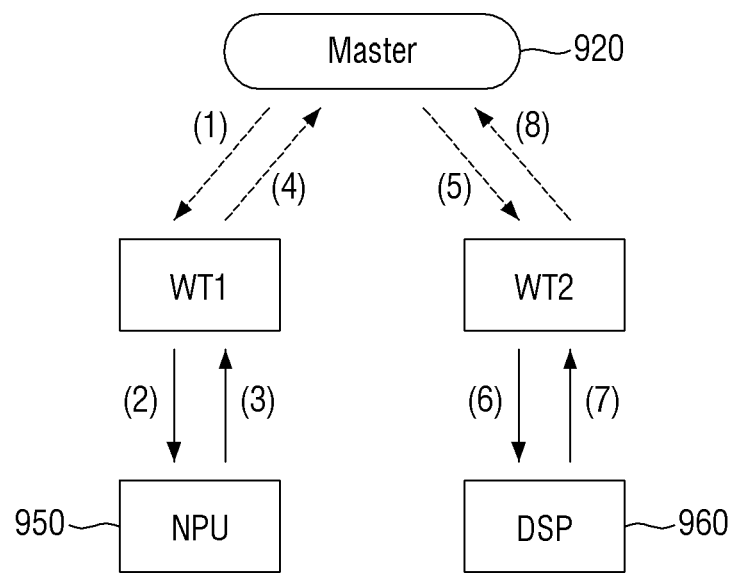

FIGS. 8 and 9 are diagrams for explaining the effect of the method of processing a task using heterogeneous processors according to some embodiments.

FIG. 8 is a diagram showing a process of processing the task corresponding to the graph of FIG. 3, by generating a worker thread for each processor, unlike the method explained above.

The master 920 instructs the worker thread WT1 to process the subtask (ST1 of FIG. 3) through the IPC (1), and the worker thread WT1 instructs the NPU 950 to process the subtask (ST1 of FIG. 3) in response to a function call (2). When processing of the NPU 950 is completed, the NPU 950 replies the processing result using a function call (3), and the worker thread WT1 replies completion of the processing of the subtask (ST1 of FIG. 3) to the master through the IPC (4).

Next, the master 920 instructs the worker thread WT2 to process the subtask (ST2 of FIG. 3) through the IPC (5), and the worker thread WT2 instructs the DSP 960 to process the subtask (ST2 of FIG. 3) in response to this (6). When processing of the DSP 960 is completed, the DSP 960 replies the processing result (7), and the worker thread WT2 replies completion of processing of the subtask (ST2 of FIG. 3) to the master 920 through the IPC (8).

In this method, the IPC occurs four times to process the task shown in FIG. 3.

On the other hand, FIG. 9 is a diagram showing a process of processing the task corresponding to the graph of FIG. 3, by generating a worker thread in the method explained above.

The master 920 instructs the worker thread WT1 to process the subtask (ST1 of FIG. 3) through the IPC (1), and the worker thread WT1 instructs the NPU 950 to process the subtask (ST1 of FIG. 3) in response to a function call (2). When processing of the NPU 950 is completed, the NPU 950 replies the processing result using a function call (3). Next, the worker thread WT1 instructs the DSP 960 to process the subtask (ST2 of FIG. 3) using a function call (4). When processing of the DSP 960 is completed, the DSP 960 replies the processing result using a function call (5), and the worker thread WT1 replies the completion of processing of the subtasks (ST1 and ST2 of FIG. 3) to the master 920 through the IPC (6).

In the method according to the present embodiment, the IPC occurs twice to process the task shown in FIG. 3.

IPC may impart 100 times more overhead to the system, compared to a function call. Therefore, when the same task is processed using more worker threads, the number of occurrences of the IPC increases, thereby degrading the operating performance of the system or the electronic device. In the present embodiment, it is possible to improve the operating performance of the system or the electronic device, by minimizing the number of times of occurrence of IPC in processing a task.

Hereinafter, referring to FIGS. 10 to 12, a method of processing a task using heterogeneous processors according to some embodiments will be described with reference to the graph shown in FIG. 10 as an example. Hereinafter, repeated explanation of the embodiments explained above will be omitted, and differences will be mainly explained.

Figure 10:
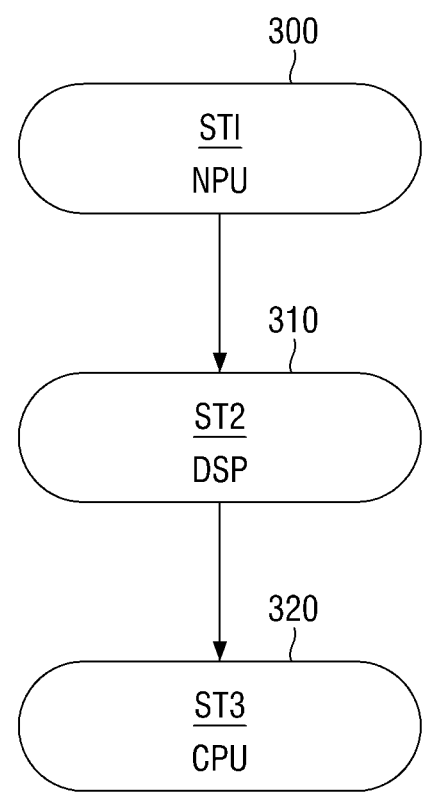
FIG. 10 is a diagram showing an example of a task defined by a graph structure.
Figure 11:
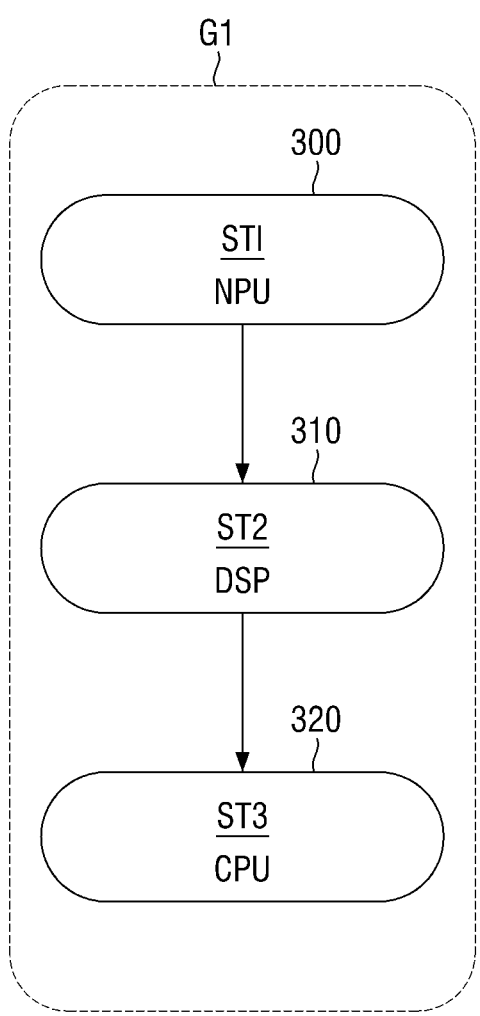
FIG. 11 is a diagram for explaining a method of grouping subtasks of FIG. 10.

FIG. 10 is a diagram showing an example of a task defined by using a graph structure. FIG. 11 is a diagram for explaining a method of grouping subtasks of FIG. 10. FIG. 12 is a diagram for explaining a method of processing the subtasks of FIG. 10.

Referring to FIG. 10, the shown exemplary task includes three subtasks ST1, ST2, and ST3. A subtask ST1 needs to be processed by an NPU 950, a subtask ST2 needs to be processed by a DSP 960, and a subtask ST3 needs to be processed by a CPU 970.

The subtask ST2 has a dependency on the subtask ST1. After the subtask ST1 is completely processed by the NPU 950, the subtask ST2 may be processed by the DSP 960. For example, when the processing result of the subtask ST1 is required to process the subtask ST2, the subtask ST2 may have a dependency on the subtask ST1.

The subtask ST3 has a dependency on the subtask ST2. After the subtask ST2 is completely processed by the DSP, the subtask ST3 may be processed by the CPU 970. For example, when the processing result of the subtask ST2 is required to process the subtask ST3, the subtask ST3 may have a dependency on the subtask ST2.

When such tasks are defined by a graph structure, the graph has three nodes 300, 310, and 320 as shown. Due to the dependency between the subtask ST1 and the subtask ST2, the node 310 becomes a child node of the node 300, and due to the dependency between the subtask ST2 and the subtask ST3, the node 320 becomes a child node of the node 310.

In the task of FIG. 10, all the three nodes have a serial dependency in which the three nodes 300, 310 and 320 are connected in series to each other. The task may be processed along the three nodes 300, 310 and 320 connected in series to each other. As a result, the three subtasks ST1, ST2 and ST3 of FIG. 10 may be grouped into the same group G1 as shown in FIG. 11.

The number of processors required to process the tasks of FIG. 10 is three, and the number of groups for the task is 1. Therefore, a master 920 may generate one worker thread WT1.

Figure 12:
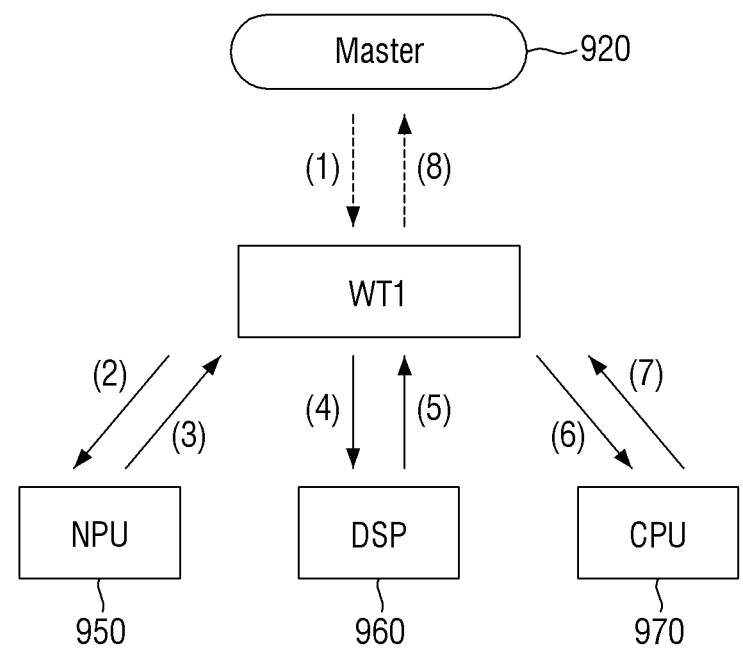
FIG. 12 is a diagram for explaining a method of processing the subtasks of FIG. 10.

Referring to FIG. 12, the master 920 instructs the worker thread WT1 to process the subtask (ST1 of FIG. 10) through the IPC (1), and the worker thread WT1 instructs the NPU 950 to process the subtask (ST1 of FIG. 10) in response to a function call (2). When processing of the NPU 950 is completed, the NPU 950 replies the processing result through a function call (3). Next, the worker thread WT1 instructs the DSP 960 to process the subtask (ST2 of FIG. 10) through a function call (4). When processing of the DSP 960 is completed, the DSP 960 replies the processing result through a function call (5). Next, the worker thread WT1 instructs the CPU 970 to process the subtask (ST3 of FIG. 10) through a function call (6). When processing of the CPU 970 is completed, the CPU 970 replies the processing result through a function call (7), and the worker thread WT1 replies the completion of processing of the subtasks (ST1, ST2, and ST3 of FIG. 10) to the master 920 through the IPC (8).

With three processors required to process the task of FIG. 10, if a worker thread is generated for each processor as described with reference to FIG. 8, IPC between the master 920 and the three worker threads for processors 950, 960 and 970 occurs six times. In contrast, when the method according to the present embodiment applies to the same task, IPC between the master 920 and the worker thread WT1 occurs twice to process the task shown in FIG. 10. Therefore, the operating performance of the system or the electronic device may increase.

Hereinafter, with reference to FIGS. 13 to 15, a method of processing a task using heterogeneous processors according to some embodiments will be described with reference to the graph shown in FIG. 13 as an example. Hereinafter, repeated explanation of the embodiments explained above will be omitted, and differences will be mainly explained.

Figure 13:
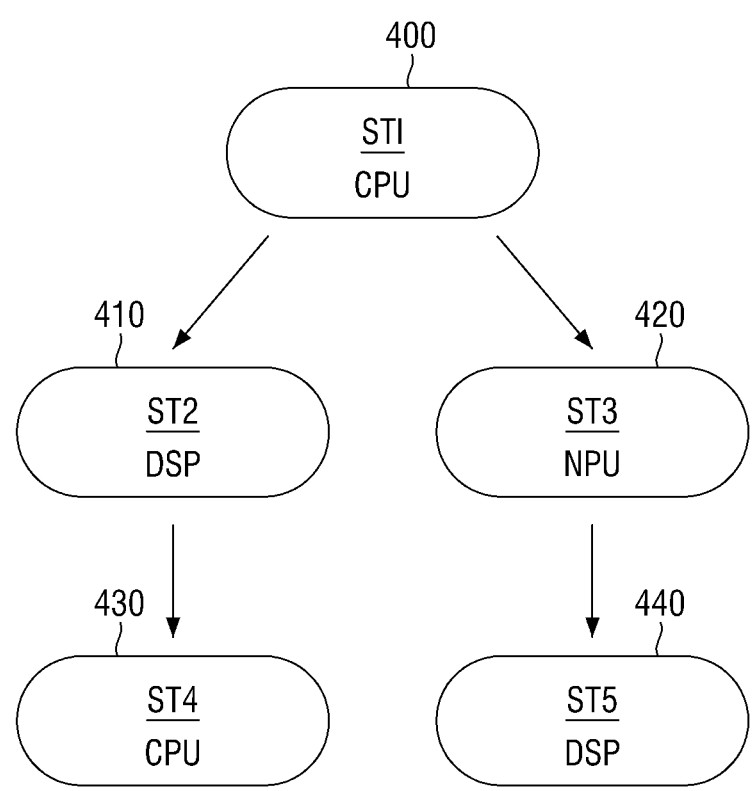
FIG. 13 is a diagram showing an example of task defined by a graph structure.
Figure 14:
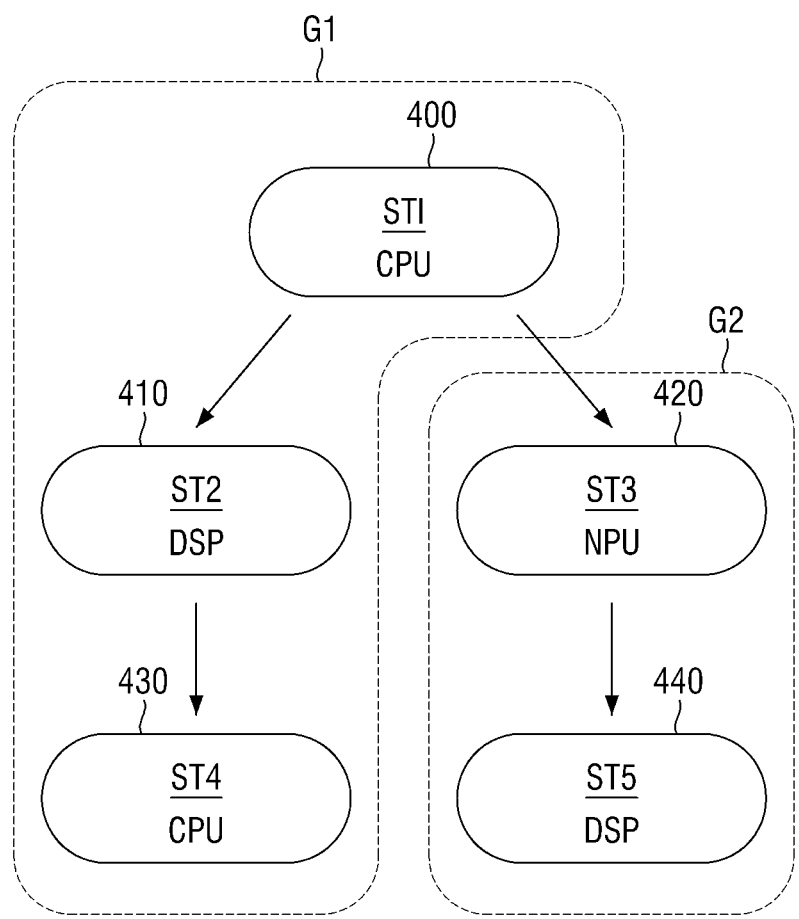
FIG. 14 is a diagram for explaining a method of grouping the subtasks of FIG. 13.

FIG. 13 is a diagram showing an example of tasks defined by a graph structure. FIG. 14 is a diagram for explaining a method of grouping the subtasks of FIG. 13. FIG. 15 is a diagram for explaining a method of processing the subtasks of FIG. 13.

Referring to FIG. 13, the shown exemplary task includes five subtasks ST1, ST2, ST3, ST4, and ST5. A subtask ST1 needs to be processed by the CPU 970, a subtask ST2 needs to be processed by the DSP 960, a subtask ST3 needs to be processed by the NPU 950, a subtask ST4 needs to be processed by the CPU, and a subtask ST5 needs to be processed by the DSP 960.

The subtask ST2 and the subtask ST3 have a dependency on the subtask ST1. After the subtask ST1 is completely processed by the CPU 970, the subtask ST2 may be processed by the DSP 960, and the subtask ST3 may be processed by the NPU 950. For example, when the processing result of the subtask ST1 is required to process the subtask ST2 and the subtask ST3, the subtask ST2 and the subtask ST3 may have a dependency on the subtask ST1.

The subtask ST4 has a dependency on the subtask ST2. After the subtask ST2 is completely processed by the DSP 960, the subtask ST4 may be processed by the CPU 970. For example, when the processing result of the subtask ST2 is required to process the subtask ST4, the subtask ST4 may have a dependency on the subtask ST2.

The subtask ST5 has a dependency on the subtask ST3. After the subtask ST3 is completely processed by the NPU 950, the subtask ST5 may be processed by the DSP 960. For example, when the processing result of the subtask ST3 is required to process the subtask ST5, the subtask ST5 may have a dependency on the subtask ST3.

When the subtasks ST1 to ST5 are defined by a graph structure, the graph has five nodes 400, 410, 420, 430, and 440 as shown. Due to the dependency of the subtask ST2 and the subtask ST3 on the subtask ST1, the node 410 and the node 420 become child nodes of the node 400. Due to the dependency between the subtask ST2 and the subtask ST4, the node 430 becomes a child node of the node 410, and due to the dependency between the subtask ST3 and the subtask ST5, the node 440 becomes a child node of the node 420.

In the task of FIG. 13, five nodes have two serial dependencies different from each other. Accordingly, the tasks of FIG. 13 may be grouped into, for example, two groups G1 and G2 as shown in FIG. 14.

The number of processors required to process the tasks of FIG. 13 is three, and the number of groups is two. Therefore, the master 920 may generate two worker threads WT1 and WT2.

Figure 15:
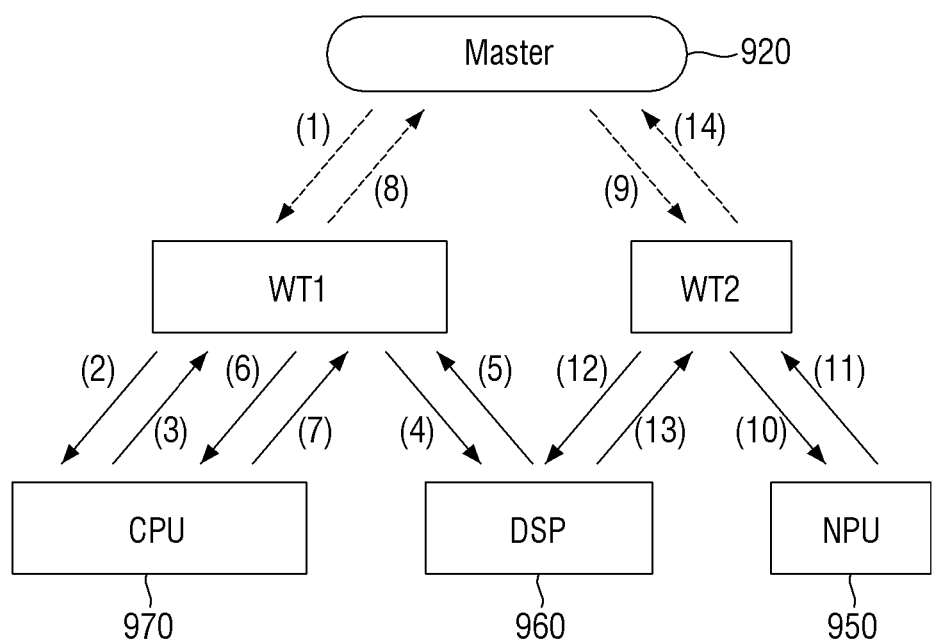
FIG. 15 is a diagram for explaining a method of processing the subtasks of FIG. 13.

Referring to FIG. 15, the master 920 instructs the worker thread WT1 to process the subtask (ST1 of FIG. 13) through the IPC (1), and the worker thread WT1 instructs the CPU 970 to process the subtask (ST1 of FIG. 13) in response to a function call (2). When processing of the CPU 970 is completed, the CPU 970 replies the processing result through a function call (3). Next, the worker thread WT1 instructs the DSP 960 to process the subtask (ST2 of FIG. 13) through a function call (4). When processing of the DSP 960 is completed, the DSP 960 replies the processing result through a function call (5). Next, the worker thread WT1 instructs the CPU 970 to process the subtask (ST4 of FIG. 13) through a function call (6). When processing of the CPU 970 is completed, the CPU 970 replies the processing result through a function call (7), and the worker thread WT1 replies the completion of processing of the subtasks (ST1, ST2, and ST4 of FIG. 13) to the master 920 through the IPC (8).

Subsequently, the master instructs the worker thread WT2 to process the subtask (ST3 of FIG. 13) through the IPC (9), and the worker thread WT2 instructs the NPU 950 to process the subtask (ST3 of FIG. 13) in response to a function call (10). When processing of the NPU 950 is completed, the NPU 950 replies the processing result through a function call (11). Next, the worker thread WT2 instructs the DSP 960 to process the subtask (ST5 of FIG. 13) through a function call (12). When processing of the DSP 960 is completed, the DSP 960 replies the processing result through a function call (13), and the worker thread WT2 replies the completion of processing of the subtasks (ST3 and ST5 of FIG. 13) to the master 920 through the IPC (14).

With three processors required to process the task of FIG. 13, if a worker thread is generated for each processor as shown in FIG. 8, IPC between the master 920 and three worker threads occurs six times. In contrast, when the method according to the present embodiment applies to the same task, IPC between the master 920 and the two worker threads WT1 and WT2 occurs four times to process the task shown in FIG. 13. Therefore, the operating performance of the system or the electronic device may increase.

Hereinafter, referring to FIGS. 16 and 17, a method of processing a task using heterogeneous processors according to some embodiments will be described with reference to the graph shown in FIG. 16 as an example. Hereinafter, repeated explanation of the embodiments explained above will be omitted, and differences will be mainly explained.

Figure 16:
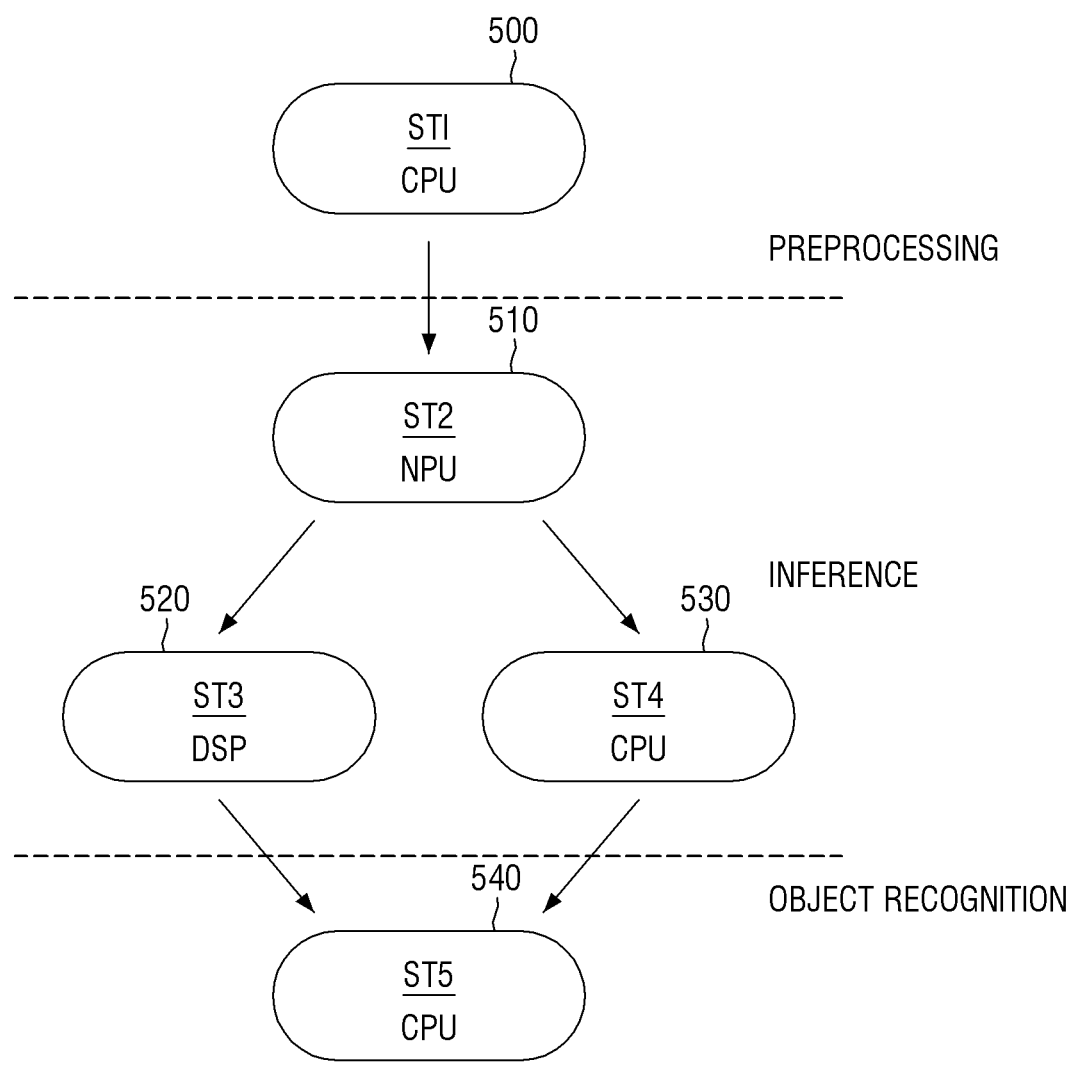
FIG. 16 is a diagram showing an example of task defined by a graph structure.
Figure 17:
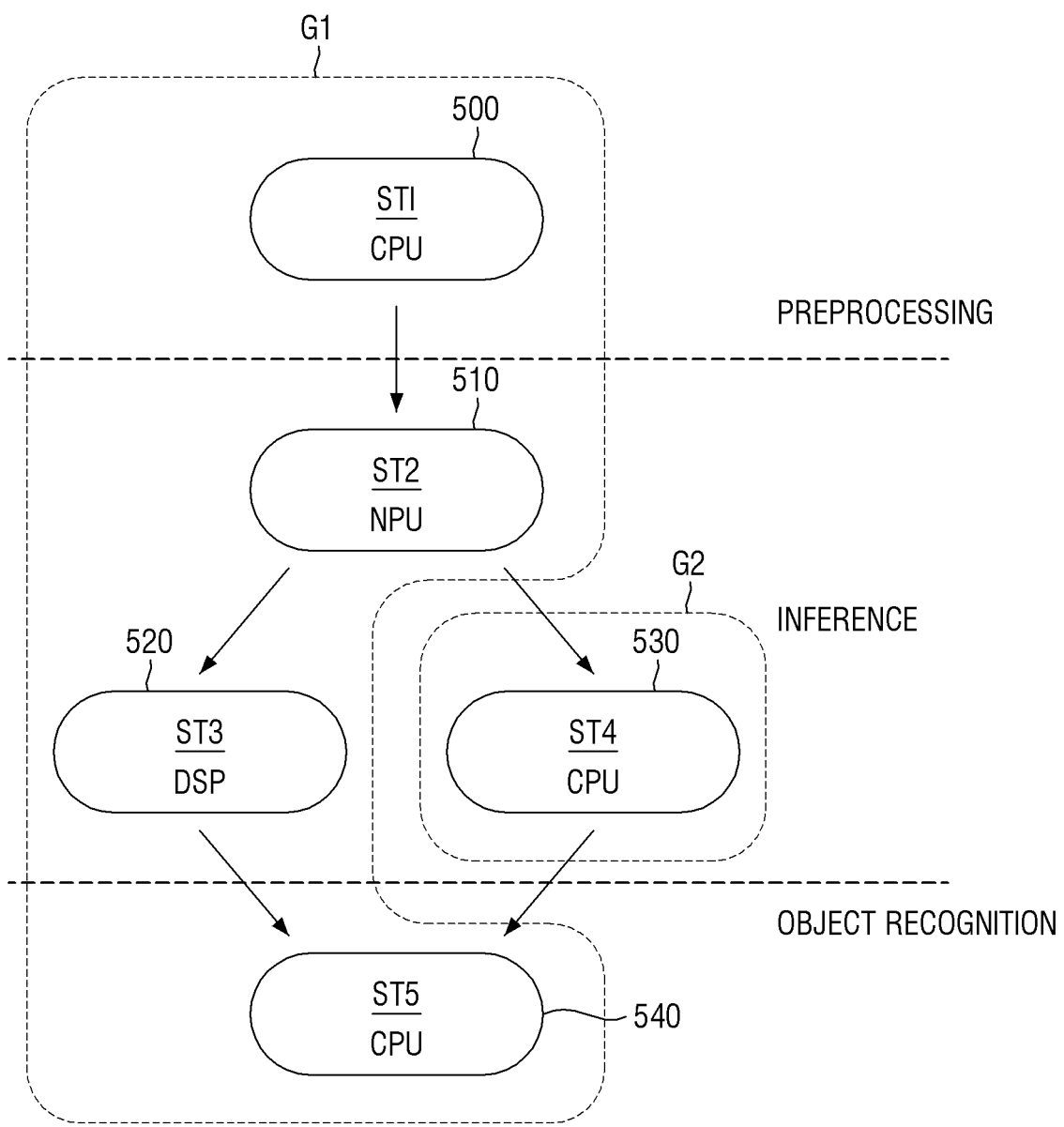
FIG. 17 is a diagram for explaining a method of grouping the subtasks of FIG. 16.

FIG. 16 is a diagram showing an example of subtasks ST1 to ST5 defined by a graph structure. FIG. 17 is a diagram for explaining a method of grouping the subtasks ST1 to ST5 of FIG. 16.

Referring to FIG. 16, the task includes five subtasks ST1, ST2, ST3, ST4, and ST5. FIG. 16 shows a task in which image data is received and an object recognition operation is performed on the image data.

The subtask ST1 may be, for example, a work that receives image data and performs pre-processing. The subtasks ST2, ST3, and ST4 may be, for example, works that perform inference on the preprocessed image data. The subtask ST5 may be, for example, a work that performs the object recognition in the image data.

The subtask ST1 needs to be processed by a CPU, the subtask ST2 needs to be processed by an NPU, the subtask ST3 needs to be processed by a DSP, the subtask ST4 needs to be processed by the CPU, and the subtask ST5 needs to be processed by the CPU.

The subtask ST2 has a dependency on the subtask ST1. After the subtask ST1 is completely processed by the CPU, the subtask ST2 may be processed by the NPU.

The subtask ST3 and the subtask ST4 have a dependency on the subtask ST2. After the subtask ST2 is completely processed by the NPU, the subtask ST3 may be processed by the DSP and the subtask ST4 may be processed by the CPU.

The subtask ST5 has a dependency on the subtask ST3 and the subtask ST4. After the subtask ST3 and the subtask ST4 are completely processed by the DSP and the CPU, respectively, the subtask ST5 may be processed by the CPU.

When the subtasks ST1 to ST5 are defined by a graph structure, the graph has five nodes 500, 510, 520, 530, and 540 as shown.

Due to the dependency between the subtask ST1 and the subtask ST2, the node 510 becomes a child node of node 500, and due to the dependency of the subtask ST3 and the subtask ST4 on the subtask ST2, the node 520 and the node 530 become child nodes of the node 510. Due to the dependency of the subtask ST5 on the subtask ST3 and of the subtask ST4, the node 540 becomes a child node of the node 520 and the node 530.

In the task of FIG. 16, five nodes 500 to 540 have two serial dependencies different from each other. Therefore, the subtasks ST1 to ST5 of FIG. 16 may be grouped into, for example, two groups G1 and G2 as shown in FIG. 17.

The number of processors required to process the tasks of FIG. 16 is three, and the number of groups is two. Therefore, a master may generate two worker threads. With three processors required to process the task of FIG. 16, when a worker thread is generated for each processor as shown in FIG. 8, IPC between a master and three worker threads occurs six times. In contrast, when the method according to the present embodiment applies to the same task, since two worker threads are generated, IPC between a master and each of the two worker threads occurs four times to process the task as shown in FIG. 16. Therefore, the operating performance of the system or the electronic device may increase.

Hereinafter, a method of generating a worker thread according to some embodiments will be described with reference to FIG. 18.

Figure 18:
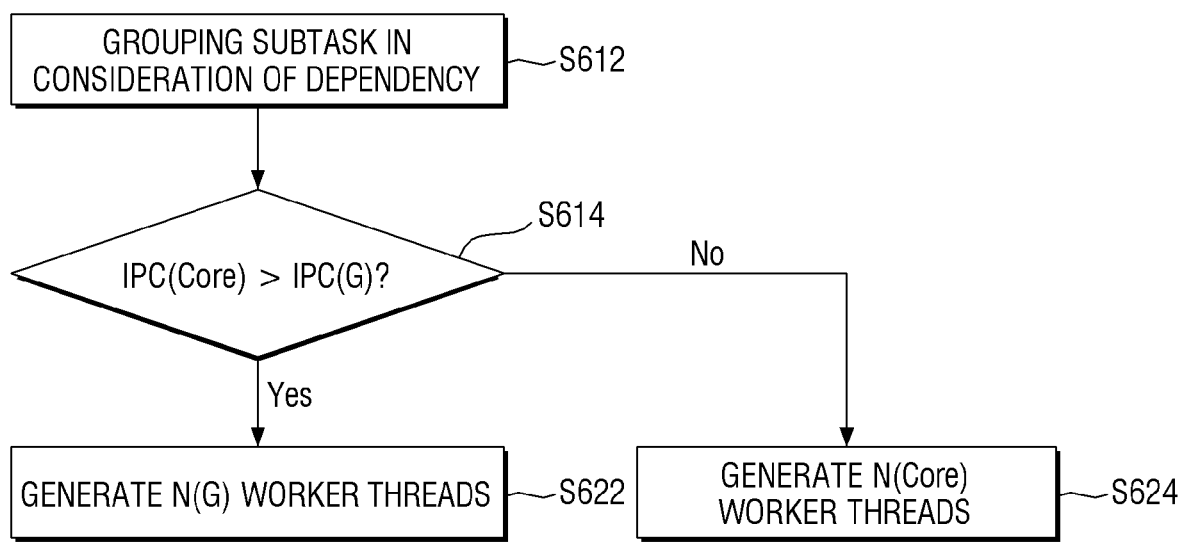
FIG. 18 is a diagram for explaining a method of generating a worker thread according to some embodiments.

FIG. 18 is a diagram for explaining a method of generating a worker thread according to some embodiments.

Referring to FIG. 18, subtasks of a graph are grouped in consideration of a dependency among the subtasks of the graph, regardless of which processor is to perform a node of the graph (S612).

Next, when the grouping work is completed, the number of times of IPCs (IPC(core)) when processing the task by generating a worker thread for each processor required to process the task is compared with the number of times of IPCs (IPC(G)) when processing the task by generating a worker thread for each group (S614). When a worker thread is generated for each processor required to process a task, a number of worker threads generated is the same as a number of processors required to process the task. When a worker thread is generated for each group, a number of worker threads generated is the same as a number of the groups.

If the number of times of IPCs (IPC(core)) when processing the task by generating the worker threads as much as the number of processors required to process the task is greater than the number of times of IPCs (IPC(G)) when processing the task by generating the worker threads as much as the number of groups, it is possible to expect the operating performance improvement of the system by the grouping, and a worker thread is generated for each group (S622). The number of worker threads generated is the same as the number of groups (S622). For example, when the number of groups is N(G), N(G) worker threads are generated.

If the number of times of IPCs (IPC(core)) when processing the task by generating the worker threads as much as the number of processors required to process the task is not greater than the number of times of IPCs (IPC(G)) when processing the task by generating the worker threads as much as the number of groups, it is not possible to expect the operating performance improvement of the system by the grouping, and a worker thread is generated for each processor (S624). The number of worker threads generated is the same as the number (N(core)) of processors required to process the task. For example, when the number of processors is N(Core), N(Core) worker threads are generated.

The embodiments explained above may be implemented as software (e.g., the program 140 of FIG. 1) including commands stored in a machine (e.g., a computer)-readable storage medium (e.g., the internal memory 136 or the external memory 138 of FIG. 1). The machine is a device that calls the commands stored in the storage medium and is operable according to the called commands, and may include, for example, the electronic device 101 of FIG. 1. When the commands are executed by a processor (e.g., processor 120 of FIG. 1), the processor may perform the function corresponding to the commands, directly or using other components under the control of the processor. The commands may include codes generated or executed by a compiler or interpreter. The machine-readable storage medium may be provided in the form of a non-transitory recording medium. Here, the term "non-transitory" means that the storage medium is tangible while not including a signal, but does not distinguish whether data is stored in the storage medium semi-permanently or temporarily.

In some embodiments, the aforementioned embodiments may be provided by being included in a computer program product. The computer program product may be traded as goods between sellers and buyers. In some embodiments, the computer program product may be distributed in the form of machine-readable storage medium (e.g., compact disc read only memory (CD-ROM)) or may be distributed online through an application store. In the case of the online distribution, at least some of the computer program products may be at least temporarily stored or temporarily generated in a storage medium such as a manufacturer's server, an application store's server, or a relay server's memory.

In concluding the detailed description, those skilled in the art will appreciate that many variations and modifications may be made to the embodiments without substantially departing from the principles of the present invention. Therefore, the disclosed embodiments of the invention are used in a generic and descriptive sense only and not for purposes of limitation.

What is claimed is:
1. An electronic device, comprising:
a master processor; and
a plurality of processors operatively coupled to the master processor, wherein the master processor is configured to process a task including a plurality of subtasks using the plurality of processors, wherein each of the plurality of processors is assigned to at least one subtask of the plurality of subtasks to process at least one subtask, wherein the master processor is configured to:

group the plurality of subtasks into a plurality of groups in consideration of execution dependencies among the plurality of subtasks, regardless of which processor of the plurality of processors is to process at least one subtask of the plurality of subtasks;

compare a number of the plurality of groups and a number of the plurality of processors to generate a comparison result;

generate a plurality of worker threads, wherein a number of the plurality of worker threads depends on the comparison result; and process the plurality of subtasks using the plurality of processors through the plurality of worker threads, wherein the plurality of processors includes n processors different from each other, n being a natural number of 2 or more, wherein the n processors are configured to process the plurality of subtasks of the task, wherein the number of the plurality of worker threads is m, m being a natural number smaller than n, and wherein the master processor is configured such that IPC (Inter Process Communication) between a master of the master processor and each of the plurality of worker threads occurs 2m times during a time when the plurality of subtasks are processed by the n processors.

2. The electronic device including heterogeneous processors of claim 1, wherein the master processor is configured to generate, in response to a first comparison result that the number of the plurality of processors is greater than the number of the plurality of groups, the plurality of worker threads, and wherein the number of the plurality of worker threads and the number of the plurality of groups are the same as each other.

3. The electronic device including heterogeneous processors of claim 2, wherein the plurality of processors include first to third processors different from each other, wherein the plurality of subtasks includes:

a first subtask to be processed by the first processor, a second subtask having a first execution dependency on the first subtask and to be processed by the second processor, and a third subtask having a second execution dependency on the first subtask and to be processed by the third processor, wherein the master processor is configured to group the first subtask and the second subtask into a first group, wherein the master processor is configured to group the third subtask into a second group, wherein the master processor is configured to generate a first worker thread which executes the first and second subtasks included in the first group, wherein the master processor is configured to generate a second worker thread which executes a third subtask included in the second group, wherein the master processor is configured to process the first subtask using the first processor and the second subtask using the second processor according to the first execution dependency, by the use of the first worker thread, and wherein the master processor is configured to process the third subtask using the third processor according to the second execution dependency, by the use of the second worker thread.

4. The electronic device including heterogeneous processors of claim 3, wherein the first processor includes an NPU (neural processing unit), wherein the second processor includes a DSP (digital signal processor), and wherein the third processor includes a CPU (central processing unit).

5. The electronic device including heterogeneous processors of claim 3, wherein the master processor is configured such that IPC between a master of the master processor and each of the first and second worker threads occurs four times during a time when the first to third subtasks are processed.

6. The electronic device including heterogeneous processors of claim 1, wherein the plurality of processors includes n processors different from each other, n being a natural number of 2 or more, wherein n processors are configured to process the plurality of subtasks, and wherein the master processor is configured to generate, in response to a second comparison result that the number of the plurality of processors is not greater than the number of the plurality of groups, the number of the plurality of worker threads such that the number of the plurality of worker threads is n.

7. The electronic device including heterogeneous processors of claim 1, wherein the plurality of processors include a first processor and a second processor different from each other, wherein the plurality of subtasks are formed of a first subtask to be processed by the first processor, and a second subtask having an execution dependency on the first subtask and to be processed by the second processor, wherein a first worker thread is generated for the first subtask and the second subtask, and wherein the master processor is configured such that IPC between a master of the master processor and the first worker thread occurs twice during a time when the first processor and the second processor are configured to process, according to the execution dependency, the first subtask and the second subtask.

8. A method of processing a task using a master processor and a plurality of heterogeneous processors, the method comprising:

receiving dependency information between a plurality of subtasks of the task to be processed by the plurality of heterogeneous processors;

grouping the plurality of subtasks into a plurality of groups in consideration of the dependency information, regardless of which processor of the plurality of heterogeneous processors is to process at least one subtask of the plurality of subtasks;

comparing a number of the plurality of groups and a number of the plurality of heterogeneous processors to generate a comparison result;

generating a plurality of worker threads, wherein a number of the plurality of worker threads depends on the comparison result; and processing the plurality of subtasks using the plurality of heterogeneous processors through the plurality of worker threads, wherein IPC (Inter Process Communication) between a master of the master processor and the each of the plurality of worker threads occurs two times the number of the plurality of worker threads during a time when the plurality of subtasks is processed by the plurality of heterogenous processors.

9. The method of claim 8, wherein the generating of the plurality of worker threads includes:

generating, in response to a first comparison result that the number of the plurality of heterogeneous processors is greater than the number of the plurality of groups, the plurality of worker threads, wherein the number of the plurality of worker threads and the number of the plurality of groups are the same as each other.

10. The method of claim 9, wherein the number of the plurality of worker threads and the number of the plurality of groups are the same as each other, and wherein the number of the plurality of worker threads is smaller than the number of the plurality of heterogeneous processors.

11. The method of claim 10, wherein the generating of the plurality of worker threads further includes:

generating, in response to a second comparison result that the number of the plurality of heterogeneous processors is not greater than the number of the plurality of groups, the plurality of worker threads, wherein the number of the plurality of worker threads and the number of the plurality of heterogeneous processors are the same as each other.

12. A method of processing a task using a master processor and a plurality of heterogeneous processors, the method comprising:

providing the task including a first subtask to be processed by a first processor of the plurality of heterogeneous processors, and a second subtask having a first execution dependency on the first subtask and to be processed by a second processor of the plurality of heterogeneous processors;

grouping the first subtask and the second subtask into a first group based on the first execution dependency;

generating a first worker thread which executes the first and second subtasks included in the first group; and processing, according to the first execution dependency, the first subtask using the first processor and the second subtask using the second processor by using the first worker thread, wherein IPC (Inter Process Communication) between the master processor and the first worker thread occurs twice, during a time when the first and second subtasks are processed.

13. The method of claim 12, further comprising:

providing a third subtask which has a second dependency on the first subtask and needs to be processed by a third processor different from the first processor and second processor;

grouping the third subtask into a second group;

generating a second worker thread which executes the third subtask included in the second group; and processing the third subtask using the third processor by the use of the second worker thread.

14. The method of claim 13, wherein IPC between the master processor and each of the first worker thread and the second worker thread occurs four times during a time when the first to third subtasks are processed.

15. The method of claim 12, wherein the task further includes a third subtask which has a second dependency on the second subtask and needs to be processed by a third processor different from the first and second processors, wherein the grouping of the first subtask and the second subtask into the first group includes grouping the third subtask into the first group, wherein the first worker thread executes the first to third subtasks included in the first group, and wherein the third subtask is processed using the third processor by the use of the first worker thread.

16. The method of claim 15, wherein IPC between the master processor and the first worker thread occurs twice during a time when the first to third subtasks are processed.

* * * * *